(No Model.)
P. DECAUVILLE.
SELF LUBRICATING BEARING FOR AXLES.
No. 253,015. Patented Jan. 31, 1882.
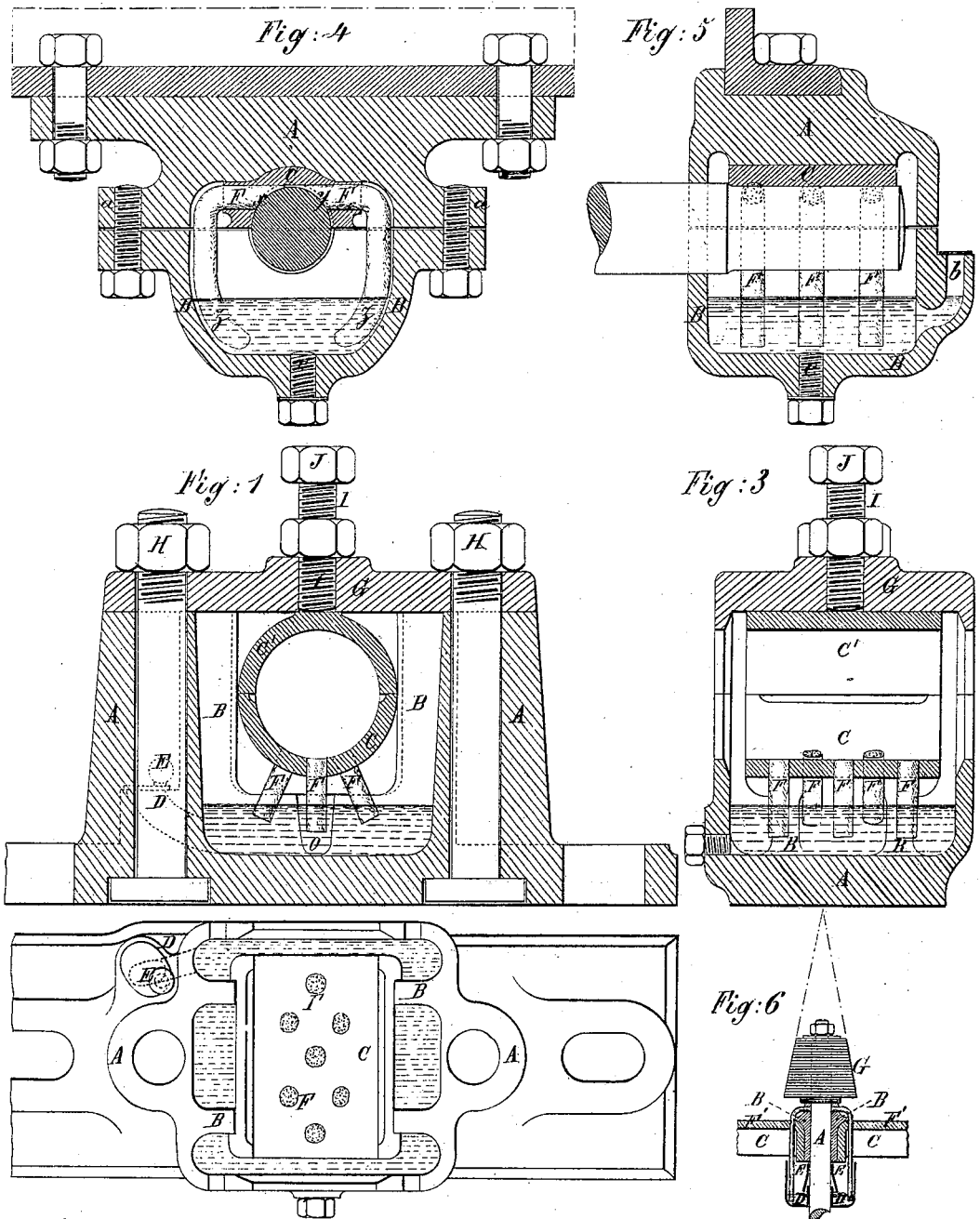

UNITED STATES PATENT OFFICE.

PAUL DECAUVILLE, OF PARIS, FRANCE.

SELF-LUBRICATING BEARING FOR AXLES.

SPECIFICATION forming part of Letters Patent No. 253,015, dated January 31, 1882.

Application filed December 16, 1881. (No model.) Patented in France February 13, 1880.

*To all whom it may concern:*

Be it known that I, PAUL DECAUVILLE, of Paris, France, have invented Improvements in Self-Lubricating Bearings for Axles or Shafts; and I do hereby declare that the following is a full, clear, and exact description of the same, reference being had to the annexed sheet of drawings, making a part of the same.

This invention relates to bearings for shafting, for the axles of wheeled vehicles, and for similar purposes, which bearings are provided with novel means whereby the shafting or the like is automatically lubricated.

According to the said invention I provide small pieces of cane or reed, which dip continually into a reservoir of oil. The great porousness of the cane is specially advantageous in two respects for the purposes of my said invention—that is to say, the oil is caused to rise by capillary attraction and by the suction caused by a vacuum. In the case of shafts revolving at a very low speed the lubrication is effected by capillary attraction; but in the case of shafts which revolve at an excessive speed—such, for example, as those used for ventilators—the lubrication is effected by a rush of oil resulting from the vacuum caused by the great speed of rotation.

In the accompanying drawings, Figure 1 represents a transverse section of a lubricating plumber-block constructed according to my invention. Fig. 2 is a plan of the same with the cap and the upper brass removed, and Fig. 3 is a longitudinal vertical section of the same. The remaining figures are hereinafter described.

The interior of the body of the block A serves as a reservoir for the oil, and there are two ribs, B, to support the lower brass. These ribs divide the reservoir into three parts, and the oil passes from one to another by means of apertures O, made in each rib. The oil is poured into the reservoir through a cup, D, cast at the side of one of the extensions made for the passage of the bolts. A small cover, E, with a stem, closes this cup. Both brasses, C and C', are fitted between the ribs B. The lower one is provided with a number of holes, which receive one end of the pieces of cane or reed F, whose other ends dip into the oil. The ends in the brass are flush with the internal surface thereof. The cap G covers the body of the plumber-block without exercising a direct pressure on the brasses. It is fixed by means of bolts H. A screw, T, is placed in the center of the cap, to regulate the pressure of the brasses on the shaft by bearing on a flat surface provided for this purpose on the upper part of the upper brass. A nut, J, prevents all loosening of the screw I.

Fig. 4 represents in transverse section an axle-box, illustrating a modification of my invention, in which the oil is caused to reach the shaft at its upper part. Fig. 5 is a longitudinal sectional view of the same. This arrangement is especially designed for use in wheeled vehicles. The upper part of the axle-box, which receives the brass C, is fixed by any suitable means to the frame of the vehicle. This part is cast with ears or extensions *a*, by means of which it is united to the lower part, B, which serves as an oil-reservoir. Three or more holes are provided in the brass, and in these holes are fixed the pieces of cane F, which dip in the oil and fit into the holes flush with the interior periphery of the brass which is in contact with the journal of the axle. The oil, filtered by its passage through the pores of the pieces of cane, is distributed over the journal at the points *x y*, Fig. 4, where the pieces of cane come in contact with the said journal. The lower extremities of the pieces of cane can be united by a wire at *z*. The oil is poured in through a small opening, *b*, and the reservoir B can be readily emptied by unscrewing a plug, *c*.

In the case of vertical shafts I prefer to employ the arrangement represented in Fig. 6, which shows the application of my improved lubricating-bearing to the upper part of a turbine shaft. In this figure, *a* is the shaft of the turbine. B B represent the brasses, which may be arranged in any suitable manner, and which receive one end of the pieces of cane C C, the other ends dipping into the oil within a cup, D, which may be fixed in any suitable manner.

As above explained, the oil is raised by capillary attraction and by the suction caused by the creation of a vacuum. In this application of my lubricating-bearing I make use of an arrangement which prevents all waste of oil. I obtain this by placing on the shaft at any suitable point a collar or ring, E, made of a suitable metal, and in the form of a truncated cone. The oil which has lubricated the shaft drops and is conducted to the cup D, which prevents it from falling to the ground or among the machinery. The ring E may be made of any suitable shape and in one or several pieces, and may be fixed to the shaft in any desired manner, so as to suit any particular case. In this figure, F' represents the frame of the turbine, and G the driving-cone.

The dimensions and the details of arrangement of these lubricating-bearings may be varied according to the different uses to which they are to be applied.

I claim—

1. A lubricating-bearing in which lubrication is effected by capillary attraction and by suction caused by a vacuum through pieces of cane or reed dipping in oil placed below the axle to be lubricated, as and for the purposes set forth.

2. In a lubricating-bearing, the combination of the axle-box A, serving as an oil-reservoir, the brasses C C', the ribs B, and the apertures O, with the cup D, receiving the oil, and the pieces of cane or reed F, the lower ends of which dip in the oil, while their upper ends are flush with the lower surface of the axle to be lubricated, substantially as described with reference to Figs. 1, 2, 3, and for the purposes set forth.

3. In a lubricating-bearing chiefly designed for vehicles, the upper part, A, of the axle-box, bolted on the frame of the vehicle and receiving the lower part, B, serving as an oil-reservoir, in combination with the upper brass, C, and the pieces of cane or reed F in contact with the journal at the points $x$ $y$, the whole arranged and working as described in reference to Figs. 4 and 5, and for the purpose set forth.

4. In a lubricating-bearing for vertical shafts, the combination, with the brasses B, the pieces of cane C, and the oil-cup D, of a collar or ring, E, having the form of a truncated cone, and fixed on the shaft A, as described in reference to Fig. 6, and for the purposes set forth.

PAUL DECAUVILLE.

Witnesses:
CHARLES DURAND,
JEAN BAPTISTE ROLLAND.